United States Patent [19]
Kamishima

[11] Patent Number: 5,506,845
[45] Date of Patent: Apr. 9, 1996

[54] ISDN TERMINAL ADAPTER USING REDUCED MEMORY FOR TIMING DIFFERENCE COMPENSATION

[75] Inventor: Yoshiyuki Kamishima, Tokyo, Japan

[73] Assignee: NEC Corporation, Tokyo, Japan

[21] Appl. No.: 301,989

[22] Filed: Sep. 9, 1994

[30] Foreign Application Priority Data

Sep. 9, 1993 [JP] Japan .................................. 5-224324

[51] Int. Cl.$^6$ .................................................. H04J 3/22
[52] U.S. Cl. ............................................................. 370/84
[58] Field of Search ............................. 370/58.1, 58.2, 370/44.1, 60, 110.1, 94.2, 95.1, 60.1, 112, 105.1, 105.2, 68.1, 58.3, 84, 105.3, 108, 102, 79; 375/220, 222, 225

[56] References Cited

U.S. PATENT DOCUMENTS 5,331,629 7/1994 Tabata et al. ......................... 370/110.1
5,400,335 3/1995 Yamada ................................. 370/110.1

Primary Examiner—Douglas W. Olms
Assistant Examiner—Dang Ton
Attorney, Agent, or Firm—Foley & Lardner

[57] ABSTRACT

In a data communication system, a non-ISDN terminal transmits a signal at twice the rate of the ISDN basic interface to the ISDN where it is divided into B1 and B2 channel signals and sent over separate channels to a distant periphery of the network where they are byte-interleaved into a single data stream. A terminal adapter for protocol conversions between non-ISDN terminal and the ISDN network includes a data receiver for receiving a data stream from the ISDN network at twice the rate of the basic interface. The received data stream is byte-deinterleaved into first and second frame sequences corresponding respectively to the separate channels. An earlier one of these frame sequences is stored into a buffer memory until the other frame sequence arrives and read therefrom to one of the inputs of an interleaver where it is byte-interleaved with the other frame sequence into a single data stream and supplied to the non-ISDN terminal.

3 Claims, 2 Drawing Sheets

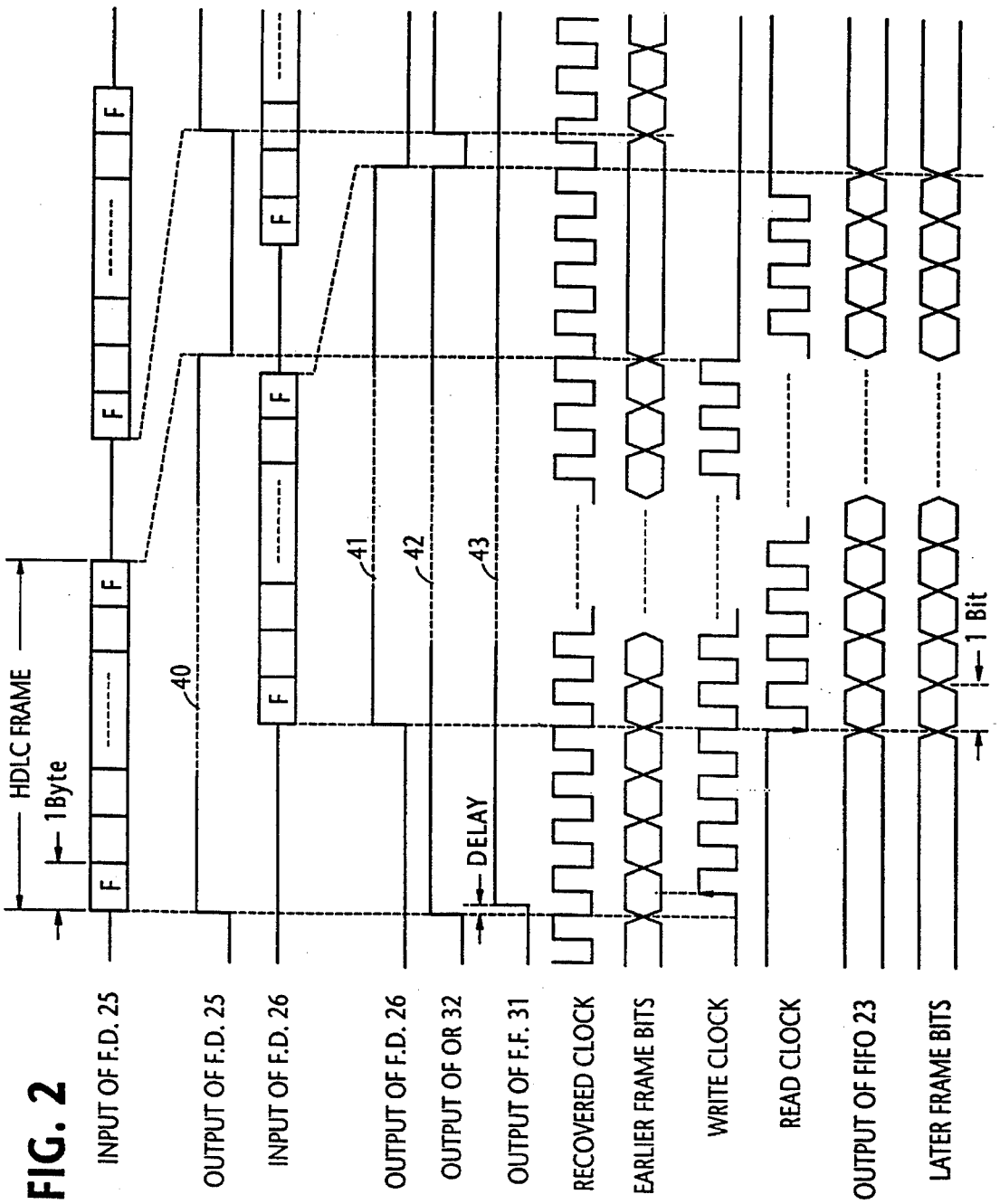

ISDN TERMINAL ADAPTER USING REDUCED MEMORY FOR TIMING DIFFERENCE COMPENSATION

BACKGROUND OF THE INVENTION

1. Field of the Invention

The present invention relates to an ISDN (integrated services digital network) terminal adapter for coupling non-ISDN terminal equipment to the ISDN network.

2. Description of the Related Art

The ISDN terminal adapter is a device that is used to provide protocol conversions between non-ISDN terminal equipment such as X.25 data terminal equipment and the ISDN. Transmission of a 128 kbps signal from such terminal equipment is carried out by using the B1 and B2 channels of the basic rate of the ISDN interface. The transmitted signal is divided into 64-kbps component signals at the entry point of the network and transmitted over separate paths to an exit point of the network where they are byte-interleaved into a 128-kbps data stream and forwarded to the destination terminal equipment. Since the separate paths are established independently in the network, there is a difference in path length between the transmitted signals, so that they arrive at the destination at different times.

In order to compensate for the path length difference, the 128-kbps signal received at the destination terminal is byte-deinterleaved into component signals and respectively stored into two buffer memories each with a capacity sufficient to hold the respective component signal. If the unit of data to be transmitted is 500 kilobytes, each buffer memory is required to store 250 kilobytes of data. Therefore, it is desired to reduce the amount of memory for timing difference compensation.

SUMMARY OF THE INVENTION

It is therefore an object of the present invention to provide an ISDN terminal adapter that allows reduction in memory capacity for compensating for the timing difference between signals transmitted over separate paths of the ISDN network.

According to the present invention, there is provided an ISDN terminal adapter connected to a non-ISDN terminal equipment which generates a signal at twice the rate of the ISDN basic interface. The terminal adapter comprises a data transmitter for transmitting the signal to an ISDN network where the signal is divided into two channel signals and carried on separate channels to a distant periphery of the network where the channel signals are byte-interleaved into a single data stream for transmission to a destination terminal. A data stream at twice the rate of the basic interface from the ISDN network is received and byte-deinterleaved into first and second frame sequences so that they correspond respectively to the separate channels. First and second switching circuits are provided and a buffer memory is connected between these switching circuits. The first switching circuit is connected to the deinterleaver and the second switching is connected to the two inputs of an interleaver whose output is connected to the non-ISDN terminal equipment. A control circuit is responsive to the first and second frame sequences for controlling the first and second switching circuits and the buffer memory so that an earlier one of the first and second frame sequences is stored into the buffer memory until the other frame sequence arrives and read therefrom to one of the inputs of the interleaver and the other frame sequence is supplied to the other input of the interleaver.

BRIEF DESCRIPTION OF THE DRAWINGS

The present invention will be described in further detail with reference to the accompanying drawings, in which:

FIG. 2 is a timing diagram for describing the operation of the terminal adapter.

DETAILED DESCRIPTION

Figure 1:
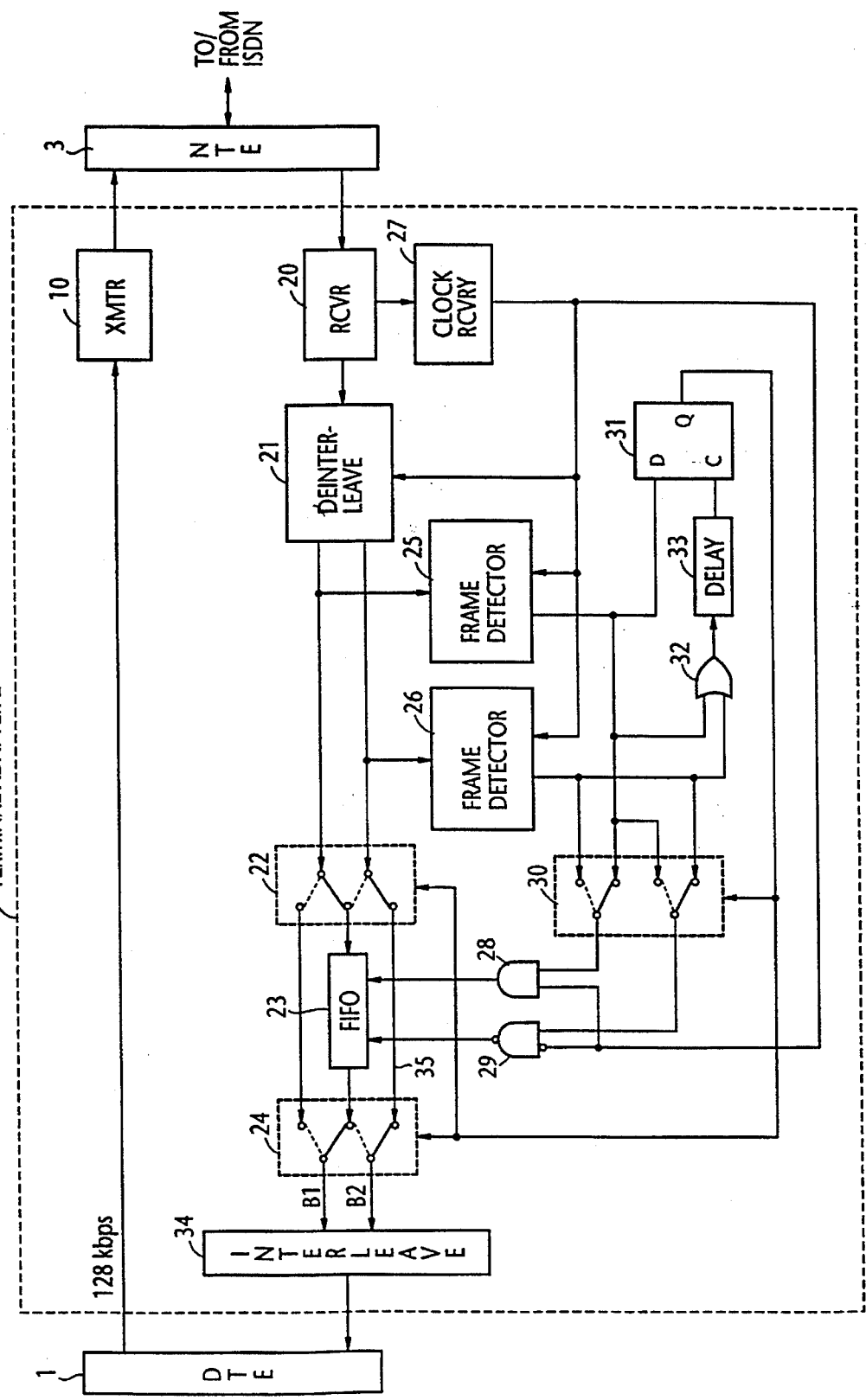
FIG. 1 is a block diagram of an ISDN terminal adapter according to the present invention.

In FIG. 1, an ISDN user station according to the present invention is illustrated. The use station is made up a non-ISDN data terminal equipment 1 such as X.25 DTE, the terminal adapter 2 of the present invention, and a network terminating equipment 3 which provides two wire-four wire conversion between the terminal adapter 2 and a pair of subscriber lines connected to the ISDN.

The terminal adapter 2 includes a data transmitter 10 which receives a 128-kbps signal from the DTE 1 and provides a conversion of the protocol of the non-ISDN DTE to the protocol of the ISDN. The output of data transmitter 10 is supplied to the NTE 3 and sent to the ISDN network. In the ISDN network, the 128-kbps signal is separated into two data streams each with the 64-kbps bit rate of the ISDN and transmitted over B1 and B2 channels of the network to the destination. The transmitted data streams may arrive at different times at the distant end of the ISDN network where they are byte-by-byte interleaved into the original 128-kbps format and sent to the destination.

Therefore, the 128-kbps incoming signal from the network is a byte-interleaved multiplex of B1- and B2-channel data blocks. The signal is received by NTE 3 and supplied to a data receiver 20, where the ISDN protocol of the signal is converted to the non-ISDN protocol. The output of the data receiver 20 is fed into a deinterleaver 21 for separating the signal into B1- and B2-channel signals and supplied to a pair of input terminals of a switch 22. Switch 22 includes a set of three output terminals to which the input terminals of the switch are selectively connected so that one of the B1- and B2-channels signals which arrives earlier than the other is entered to a FIFO (first-in-first-out) memory 23 via the center output terminal of the switch 22 and the later-arrived signal is coupled through one of the upper and lower output terminals of the switch to the corresponding input terminals of a switch 24 which is identical to switch 22. The input terminals of switch 24 are selectively connected via the output terminals of the switch to an interleaver 34 connected to the DTE 1.

The B1- and B2-channel outputs of deinterleaver 21 are HDLC frames which are supplied to frame detectors 25 and 26, respectively. Each frame detector has an 8-bit flag detector for detecting the leading and trailing flags of an HDLC frame to produce a pulse of duration corresponding to the length of the frame. A clock recovery circuit 27 is connected to the receiver 20 to provide clock pulses to deinterleaver 21, frame detectors 26 and 27. The clock pulses are also fed to an AND gate 28 and a NAND gate 29 to supply write and read clock pulses to FIFO 23.

The outputs of frame detectors 25 and 26 are selectively connected to the AND gate 28 and NAND gate 29 by way of a switch 30 as an enable pulse. The output of frame detector 25 is connected to the data input of a D flip-flop 31 and an OR gate 32 to which the output of frame detector 26 is also connected. The output of OR gate 32 is supplied through a delay element 33 to the clock input of the flip-flop 31. The output of flip-flop 31 is applied to switches 22, 24 and 30 as a switching control signal. As will be described hereinbelow, if the leading edge of the output of frame detector 25 occurs earlier than the leading edge of the output of frame detector 26, flip-flop 31 produces a high-level output that causes the moving contacts of switches 22, 24, 30 to move to the lower positions as indicated by solid lines. If the reverse is true, it produces a low-level output that causes all the switches to move to the upper positions as indicated by broken lines.

The operation of the terminal adapter when it receives a 128-kbps signal from the ISDN network will be described with reference to FIG. 2. Assuming that the HDLC frame input to the frame detector 25 arrives earlier than the input of the frame detector 26, frame detectors 25 and 26 produce pulses 40 and 41, respectively. OR gate 32 thus produces a pulse 42 lasting from the leading edge of pulse 40 to the trailing edge of pulse 41. In response to the pulse 40 from frame detector 25, the data input of flip-flop 31 goes high, and following a small delay introduced by the delay element 33, the output pulse 42 of OR gate 32 causes flip-flop 31 to go high as shown at 43. Therefore, switches 20, 24 and 30 are moved to their lower positions, coupling the earlier-arriving frame to the FIFO 23 and the later-arriving frame to the DTE 1 through a direct path 35, while coupling the pulses 40 and 41 to AND gate 28 and NAND gate 29, respectively.

The AND gate 28 is therefore enabled in response to the earlier pulse 40 to pass the clock as write clock to FIFO 23 to cause it to start writing the earlier frame bits at the leading edge of each pulse of the write clock. Following the time difference between the B1- and B2-channel frames, the pulse 41 is combined in the NAND gate 29 with inverted clock to supply read clock to FIFO 23 to cause it to start reading the stored frame bits at the trailing edge of each pulse of the read clock.

As a result, the earlier frame bits are read bit by bit out of the FIFO 23 exactly corresponding to the later frame bits. The time-coincident B1 and B2-channel frames are input to the interleaver 34 where they are byte-interleaved into a signal of the original format and supplied to the DTE 1.

If a data file of 500 kilobytes is separated into B1 and B2 frames and transmitted to the ISDN on separate paths and a time difference of 0.1 seconds occurs between the frames at the destination, the amount of frame bits received during this time difference is 6.4 kilobits (=64 kbps×0.1), or 0.8 kilobytes. Since the maximum time difference that may be encountered is about 0.1 seconds, the amount of memory required for FIFO 23 is 0.8 kilobytes, which compares favorably with the prior art terminal adapter where 500 kilobytes of memory is required.

What is claimed is:

1. An ISDN (integrated services digital network) terminal adapter connected to a non-ISDN terminal equipment which generates a signal at twice the rate of an ISDN basic interface, said terminal adapter comprising:

transmit means for transmitting said signal to an ISDN network where the signal is divided into two channel signals and transmitted over separate channels to a distant periphery of the network where the channel signals are byte-interleaved into a single data stream for transmission to a destination non-ISDN terminal equipment;

receive means for receiving said data stream from said ISDN network;

deinterleaving means for separating the received data stream into first and second frame sequences on a byte-by-byte basis, said first and second frame sequences corresponding respectively to said separate channels;

first switch means connected to said deinterleaving means;

a buffer memory connected to said first switch means;

second switch means connected to said buffer memory;

interleaving means having two inputs connected to said second switch means and an output connected to said non-ISDN terminal equipment; and control means responsive to said first and second frame sequences for controlling said first and second switch means and said buffer memory so that an earlier one of said first and second frame sequences is stored into said buffer memory until the other frame sequence arrives and read therefrom to one of the inputs of said interleaving means and the other frame sequence is supplied to the other input of said interleaving means.

2. An ISDN terminal adapter as claimed in claim 1, wherein said control means comprises:

first frame detector means for detecting each of the frames of the first frame sequence and producing therefrom a first enable pulse of duration corresponding to the duration of a frame of the first frame sequence;

second frame detector means for detecting each of the frames of the second frame sequence and producing therefrom a second enable pulse of duration corresponding to the duration of a frame of the second frame sequence;

means responsive to said first and second enable pulses for generating a switching control signal and applying the switching control signal to said first and second switch means;

clock recovery means for deriving clock pulses from the data stream received by said receive means;

first and second gate means connected to the clock recovery means and said buffer memory; and switch means for selectively coupling said first and second enable pulses to said first and second gate means in accordance with said switching control signal so that a sequence of write clock pulses is supplied from said first gate means to said buffer memory in response to an earlier one of said first and second enable pulses and a sequence of read clock pulses is supplied from said second gate means to said buffer memory in response to the other enable pulse.

3. An ISDN terminal adapter as claimed in claim 2, wherein said first gate means is a AND gate and said second gate means is an NAND gate, the NAND gate receiving an inverted sequence of the clock pulses from said clock recovery means.

* * * * *